(12) United States Patent
Kim

(10) Patent No.: US 10,321,782 B2
(45) Date of Patent: Jun. 18, 2019

(54) ELECTRIC RICE PRESSURE COOKER AND PRESSURE COOKER WITHOUT A RUBBER PACKING

(76) Inventor: Woo Yong Kim, Gyeonggi-do (KR)

( * ) Notice: Subject to any disclaimer, the term of this patent is extended or adjusted under 35 U.S.C. 154(b) by 466 days.

(21) Appl. No.: 14/345,373

(22) PCT Filed: Sep. 13, 2012

(86) PCT No.: PCT/KR2012/007339
§ 371 (c)(1),
(2), (4) Date: Mar. 17, 2014

(87) PCT Pub. No.: WO2013/039332
PCT Pub. Date: Mar. 21, 2013

(65) Prior Publication Data
US 2014/0360384 A1 Dec. 11, 2014

(30) Foreign Application Priority Data

Sep. 15, 2011 (KR) .................. 10-2011-0093046
May 18, 2012 (KR) .................. 10-2012-0053161
(Continued)

(51) Int. Cl.
*A47J 27/08* (2006.01)
*A47J 27/09* (2006.01)

(52) U.S. Cl.
CPC .......... *A47J 27/08* (2013.01); *A47J 27/0806* (2013.01); *A47J 27/09* (2013.01)

(58) Field of Classification Search
CPC ........ A47J 27/00; A47J 27/08; A47J 27/0806; A47J 27/09
(Continued)

(56) References Cited

U.S. PATENT DOCUMENTS 5,442,998 A * 8/1995 Niese .................. A47J 27/0813
126/369
5,632,403 A * 5/1997 Deng .................. A47J 27/08
220/203.07
(Continued)

FOREIGN PATENT DOCUMENTS

CN    1168258 A    12/1997
CN    1714713 A    1/2006
(Continued)

OTHER PUBLICATIONS

European Search Report corresponding to EP12832591.7, dated Sep. 30, 2015.
(Continued)

*Primary Examiner* — Ibrahime A Abraham
*Assistant Examiner* — Justin C Dodson
(74) *Attorney, Agent, or Firm* — Kilpatrick Townsend & Stockton LLP

(57) ABSTRACT

Electric rice pressure cooker without rubber packing includes a case, an inner pot inside case, and a cover coupled to case. Inner pot has flange portions provided on a top portion along a circumferential direction and the top end has a tapered surface. Cover includes a sealing member having a hole in its center and a bottom surface seated on inner pot. An inner cover includes a space for sealing member to move vertically, inner surface of space maintains a seal with the end portion of sealing member. The surface of inner pot tapers inwards, a bent portion of sealing member contacts the sloped surface and inner surface of inner cover, and part of bent portion contacting the sloped surface acts as a sealing surface corresponding in shape to the sloped surface, so steam from cooking passes through the hole and presses sealing member downward to maintain a seal.

6 Claims, 12 Drawing Sheets

(30) Foreign Application Priority Data

Aug. 23, 2012 (KR) .................. 10-2012-0092488
Sep. 7, 2012 (KR) .................. 10-2012-0099466

(58) Field of Classification Search
USPC ......... 99/324, 331, 337, 403, 342, 349, 453,
99/454; 219/429, 431, 432, 433, 440;
126/274, 369, 373.1, 374.1
See application file for complete search history.

(56) References Cited

U.S. PATENT DOCUMENTS

| | | | | |
|---|---|---|---|---|
| 5,839,357 | A | * | 11/1998 | Ha .................. A47J 27/0813 |
| | | | | 99/337 |
| 6,186,356 | B1 | * | 2/2001 | Berkley .................. F17C 1/00 |
| | | | | 220/304 |
| 6,705,209 | B2 | * | 3/2004 | Yang .................. A47J 27/0802 |
| | | | | 219/440 |
| 2003/0024936 | A1 | * | 2/2003 | Niese .................. A47J 27/08 |
| | | | | 220/573.1 |
| 2009/0282987 | A1 | * | 11/2009 | MacMahon ......... A47J 31/0668 |
| | | | | 99/288 |
| 2011/0147365 | A1 | | 6/2011 | Pellerin et al. | |

FOREIGN PATENT DOCUMENTS

| | | |
|---|---|---|
| CN | 1957807 A | 5/2007 |
| CN | 101112289 A | 1/2008 |
| JP | 58-78619 A | 5/1983 |
| JP | 59-16524 U | 2/1984 |
| JP | 59-48331 U | 3/1984 |
| JP | 59-95929 U | 6/1984 |
| JP | 60-47616 U | 4/1985 |
| JP | 61-279211 A | 12/1986 |
| JP | 62-184823 U | 11/1987 |
| JP | 7-229590 A | 8/1995 |
| JP | 7-275119 A | 10/1995 |
| JP | 10-201621 A | 8/1998 |
| JP | 10-295539 A | 10/1998 |
| JP | 2001-025436 A | 1/2001 |
| JP | 2003-135268 A | 5/2003 |
| JP | 2004-081329 | 3/2004 |
| JP | 2008-54913 A | 3/2008 |
| JP | 2008-126084 A | 6/2008 |
| JP | 09-001160 | 1/2009 |
| JP | 15-0016951 | 1/2015 |
| KR | 10-0143127 B1 | 7/1998 |
| KR | 20-0196405 Y1 | 9/2000 |
| KR | 10-2003-0075036 A | 9/2003 |
| KR | 20-0394881 Y1 | 8/2005 |
| KR | 10-2007-0020100 A | 2/2007 |
| KR | 10-0848866 B1 | 7/2008 |
| KR | 10-1166253 B1 | 7/2012 |

OTHER PUBLICATIONS

Office Action corresponding to Chinese Patent Application No. 201280055803.6, dated May 13, 2015.
The Notice of Allowance, dated Jan. 9, 2013 of Korean Patent Application No. 10-2012-0053161.
The Notice of Allowance, dated Mar. 14, 2013 of Korean Patent Application No. 10-2012-0099466.
International Search Report and Written Opinion of PCT/KR2012/007339, dated Feb. 20, 2013.
Office Action translation for corresponding Japanese Patent Application No. JP 2014-530589.

* cited by examiner

[Fig. 1]
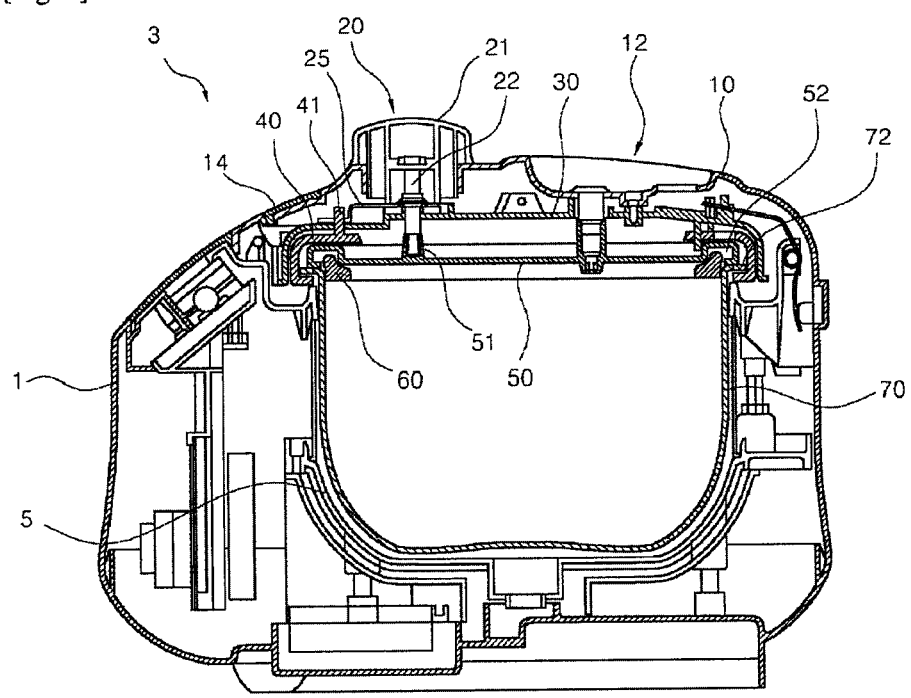
Prior Art

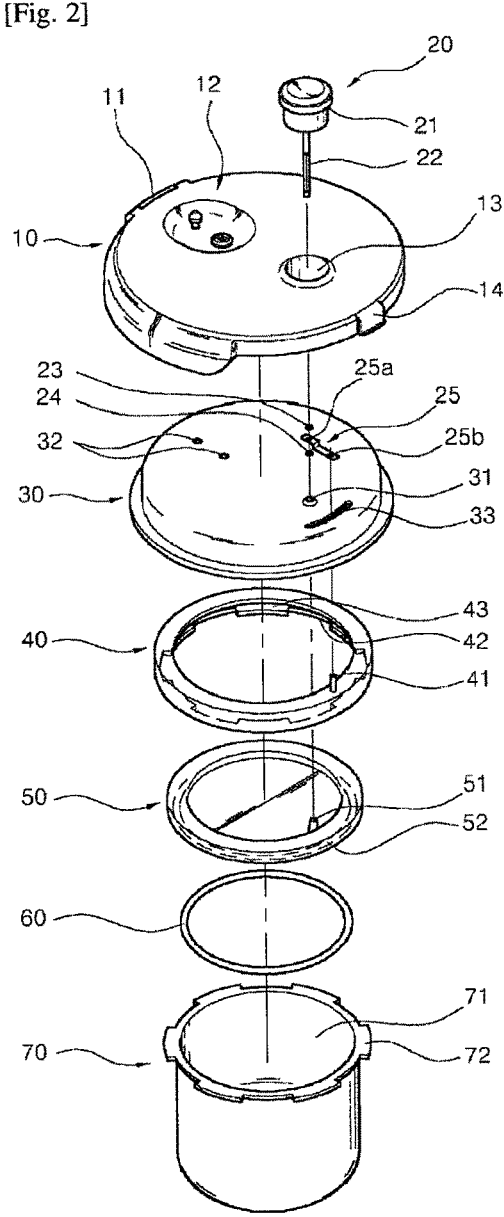
Prior Art

[Fig. 3]
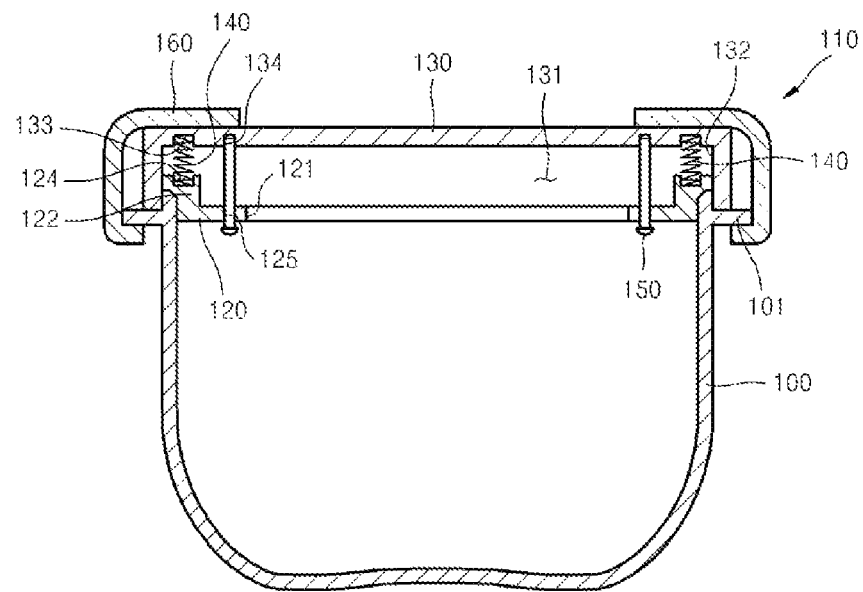
[Fig. 4]
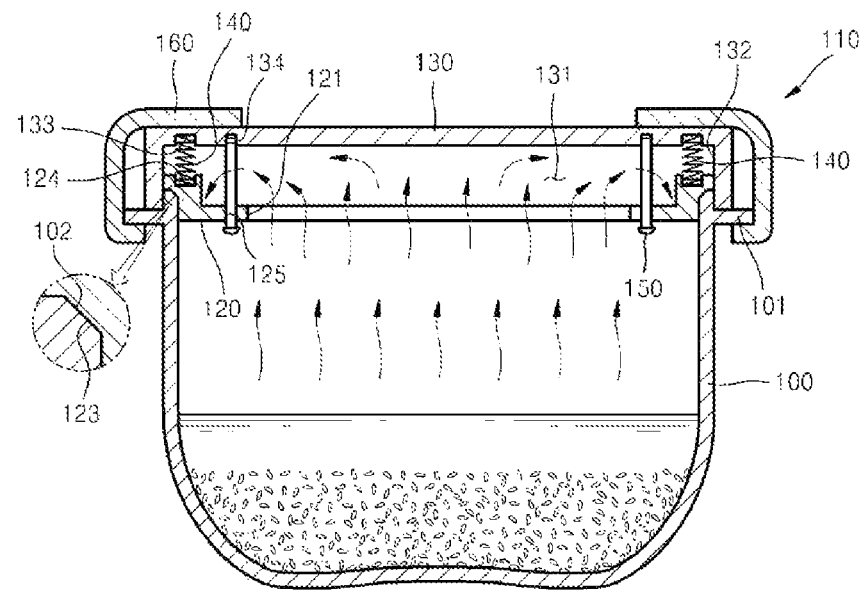

[Fig. 5]
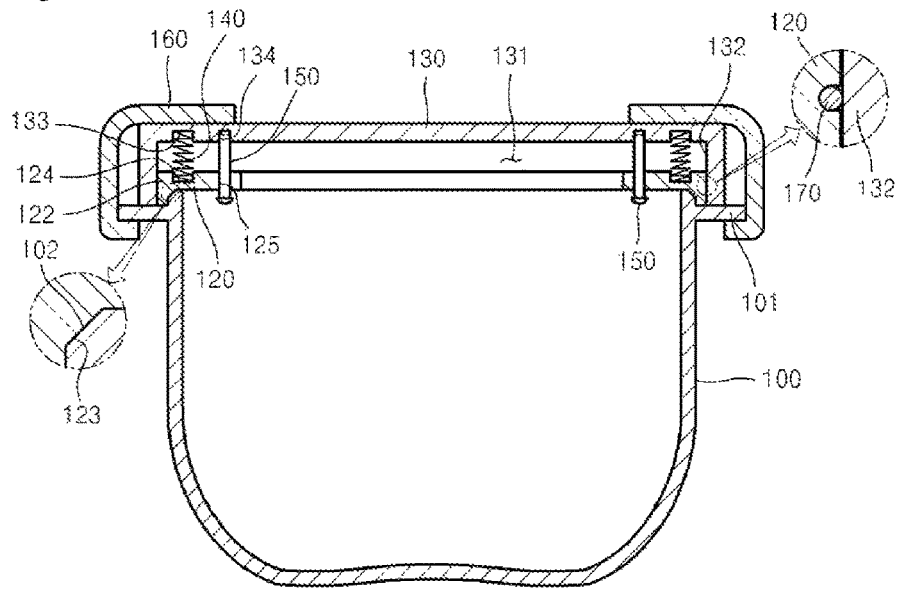
[Fig. 6]
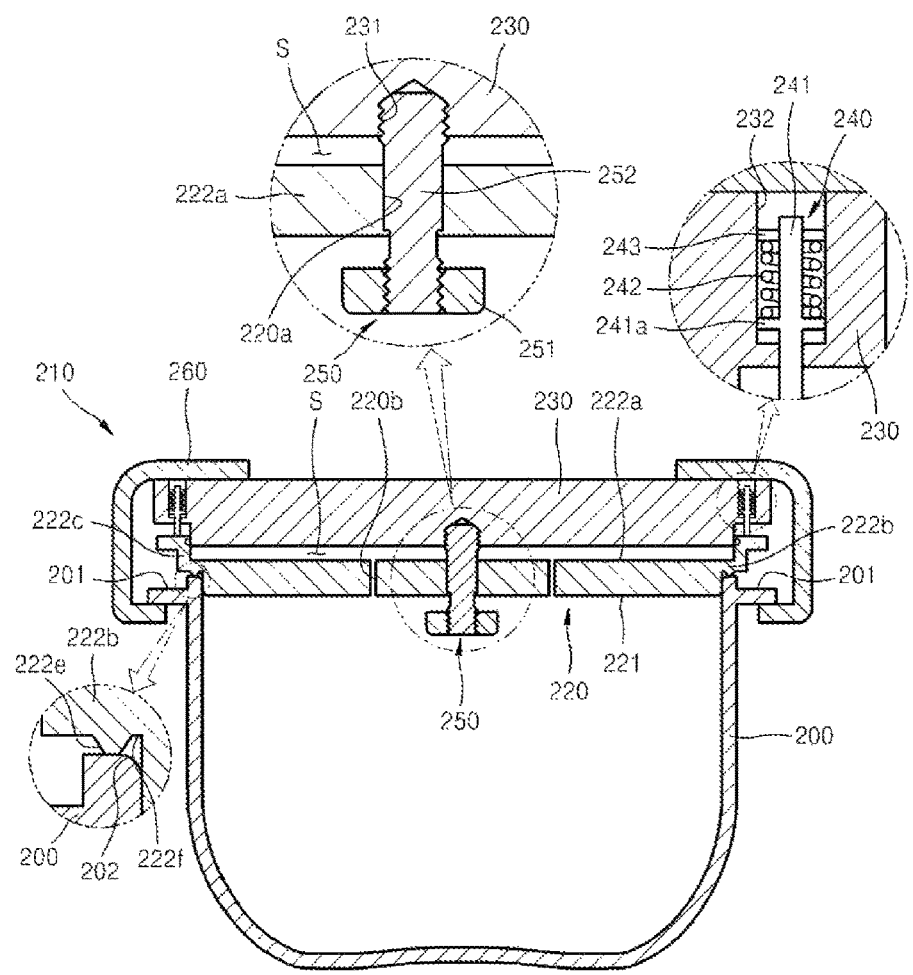

[Fig. 7]
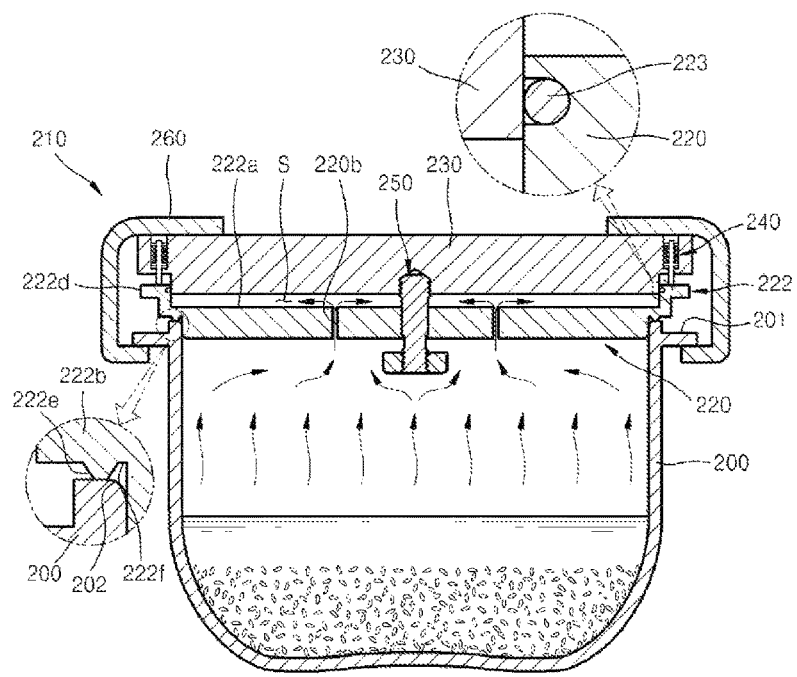
[Fig. 8]
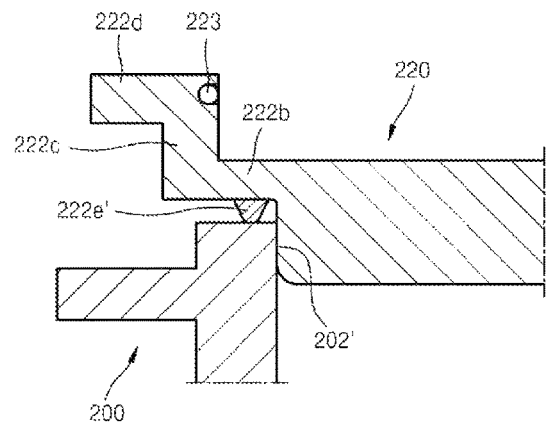
[Fig. 9]
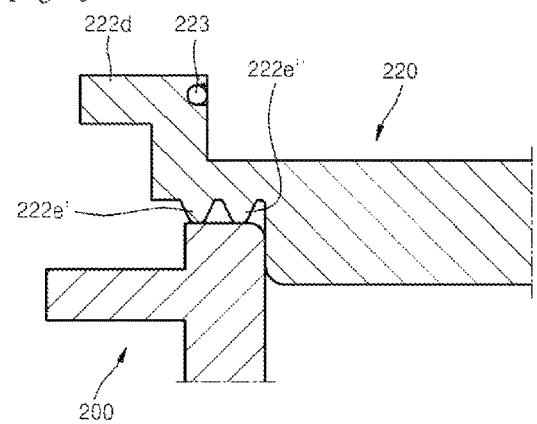

[Fig. 10]
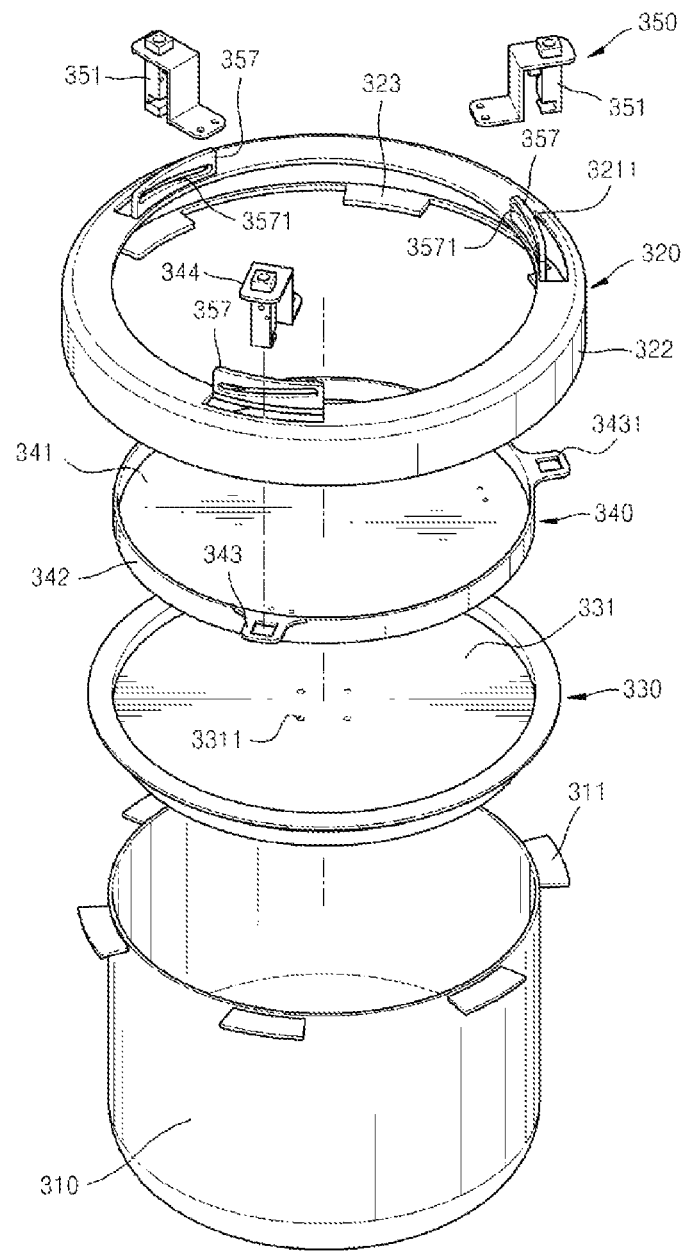

[Fig. 11]
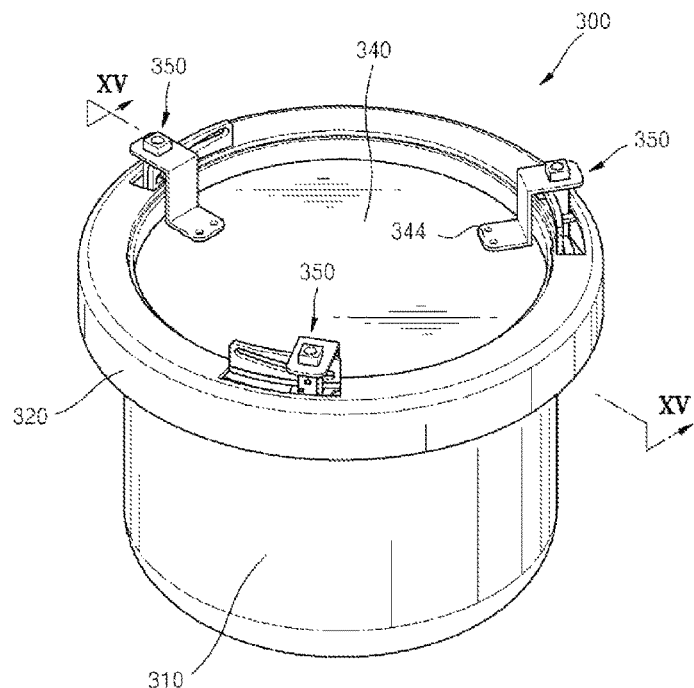
[Fig. 12]
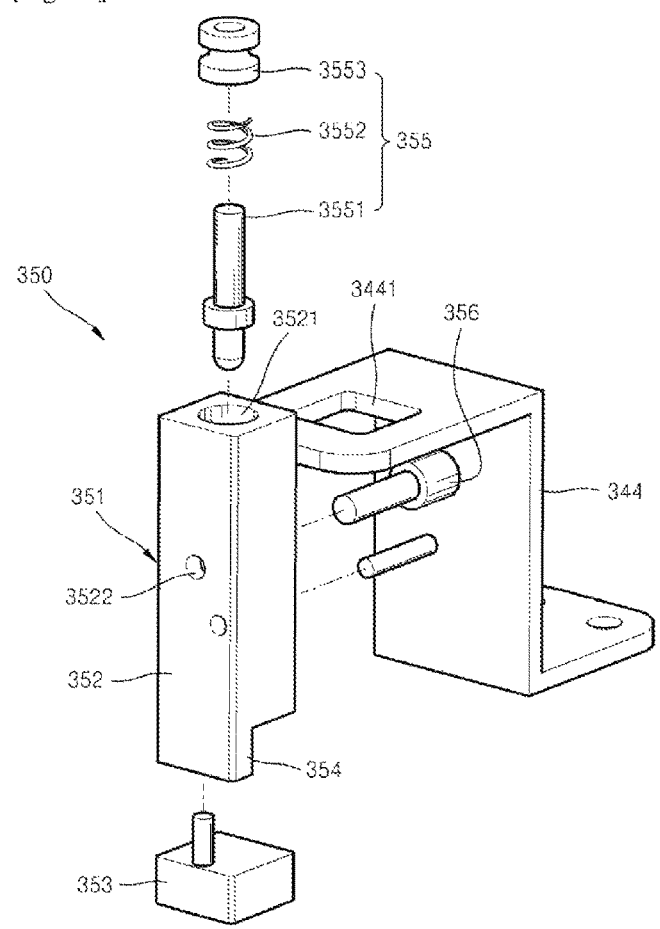

[Fig. 13]
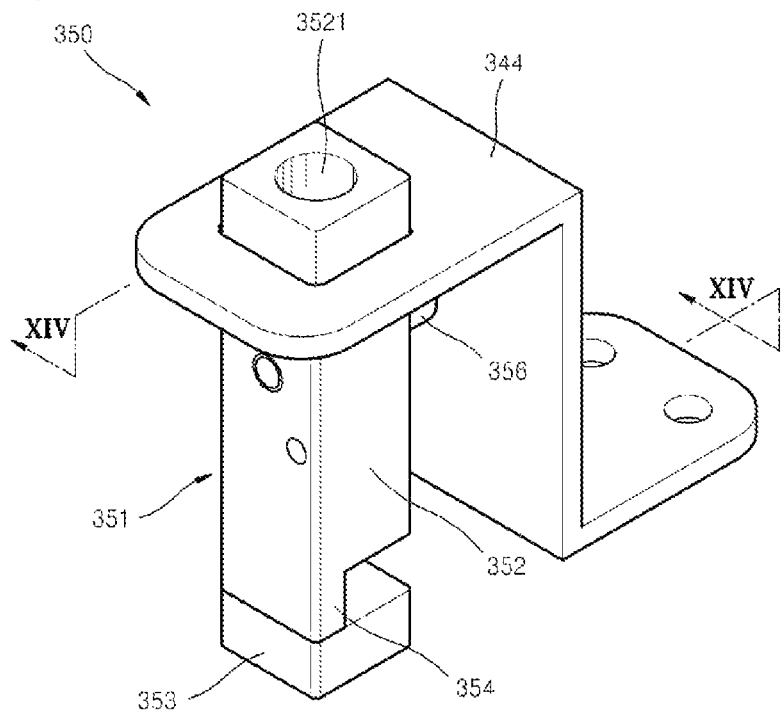
[Fig. 14]
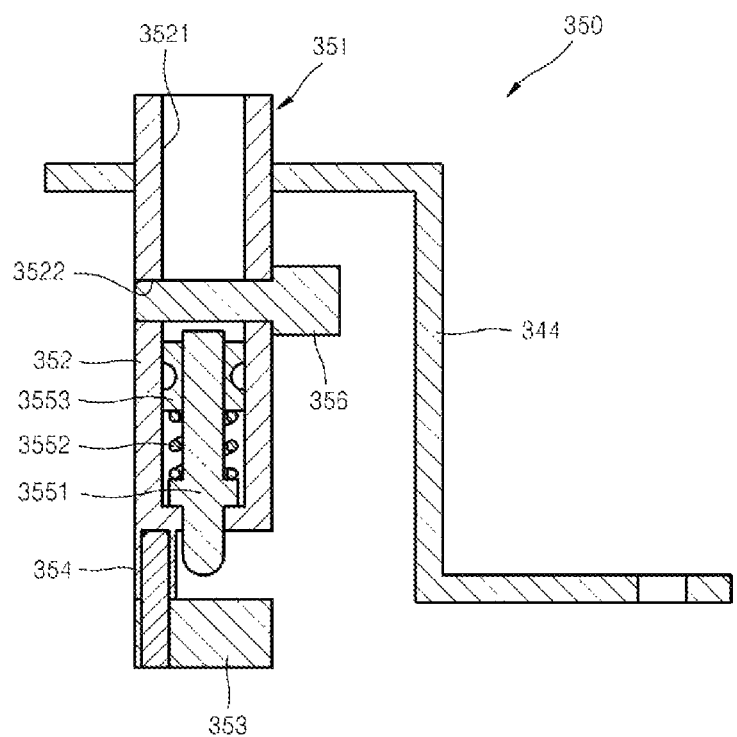

[Fig. 15]
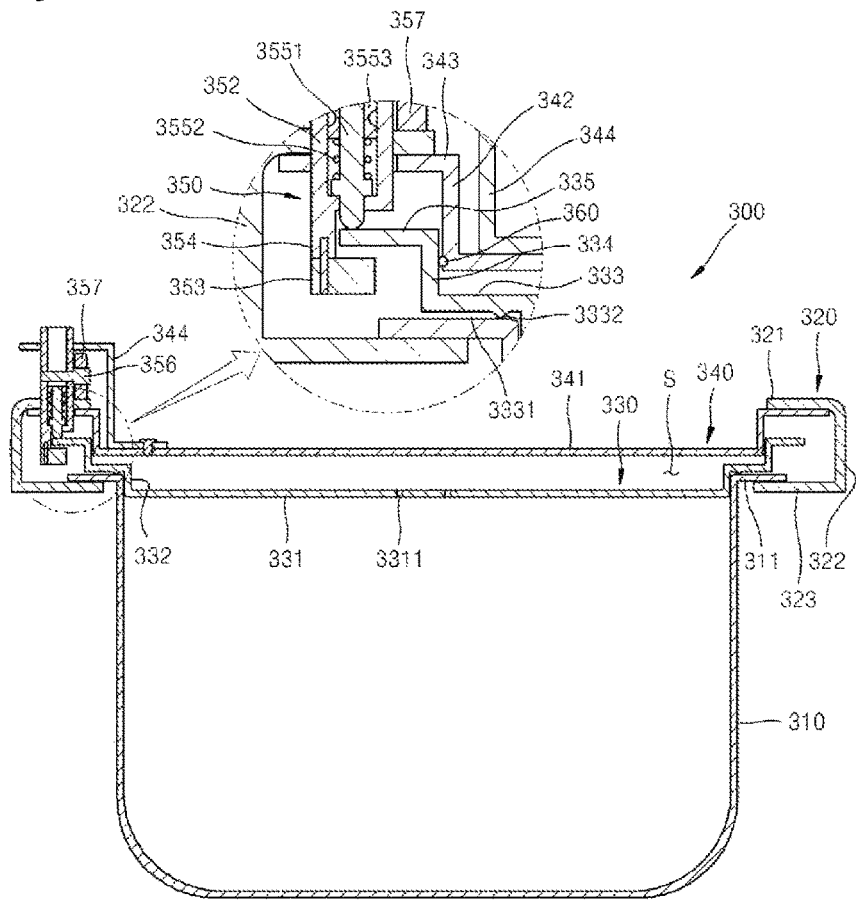
[Fig. 16]
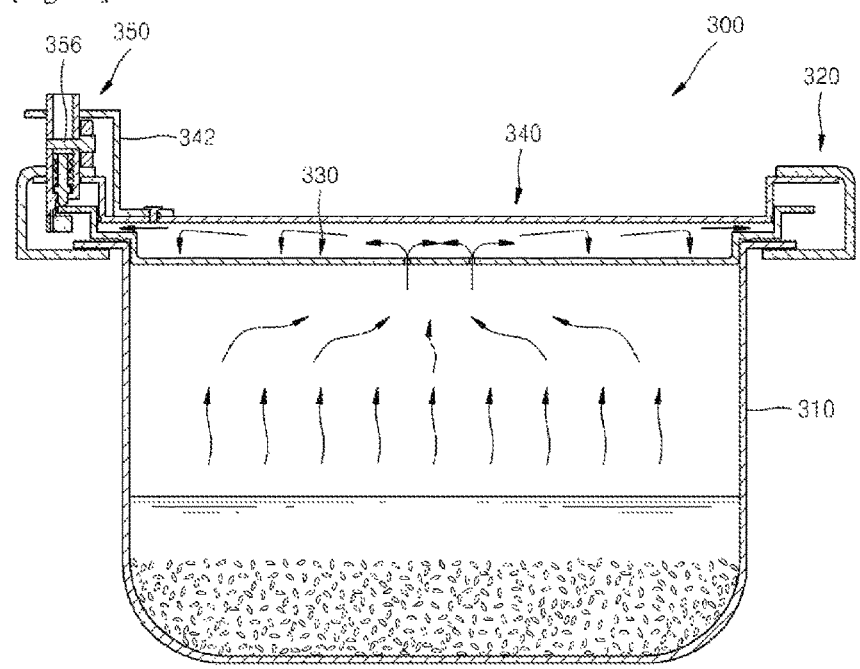

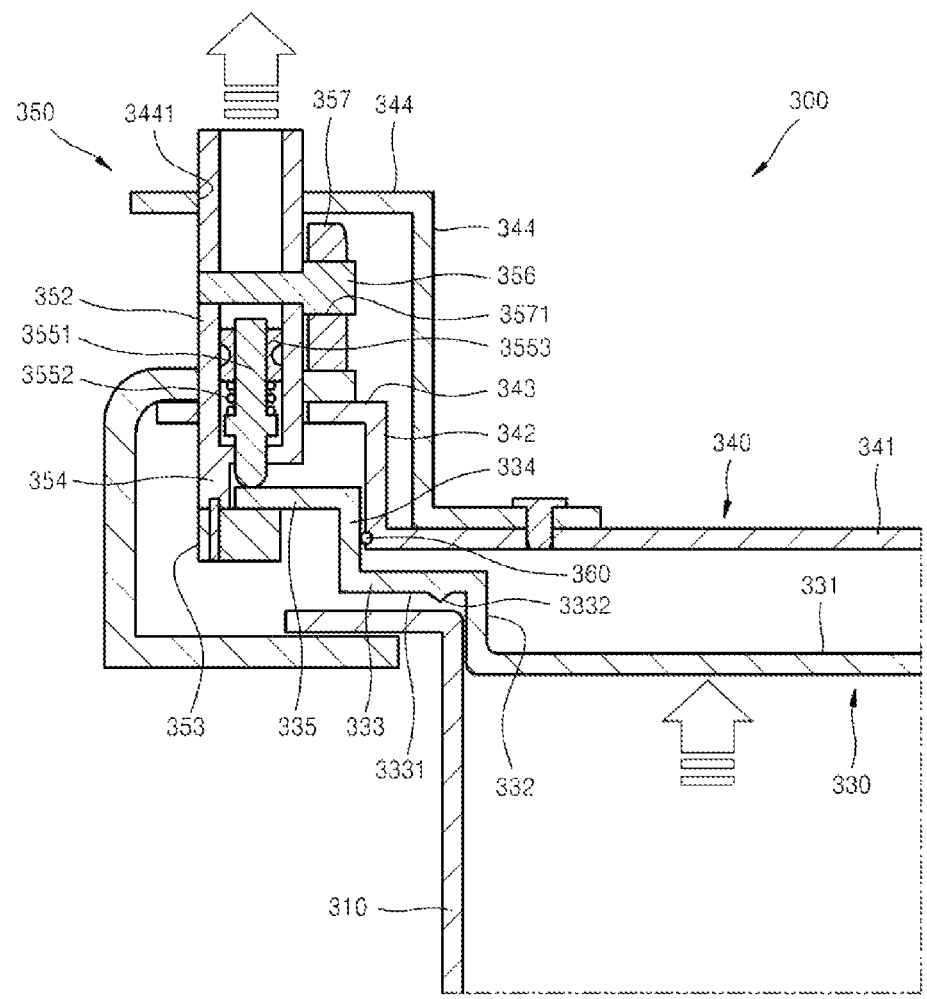

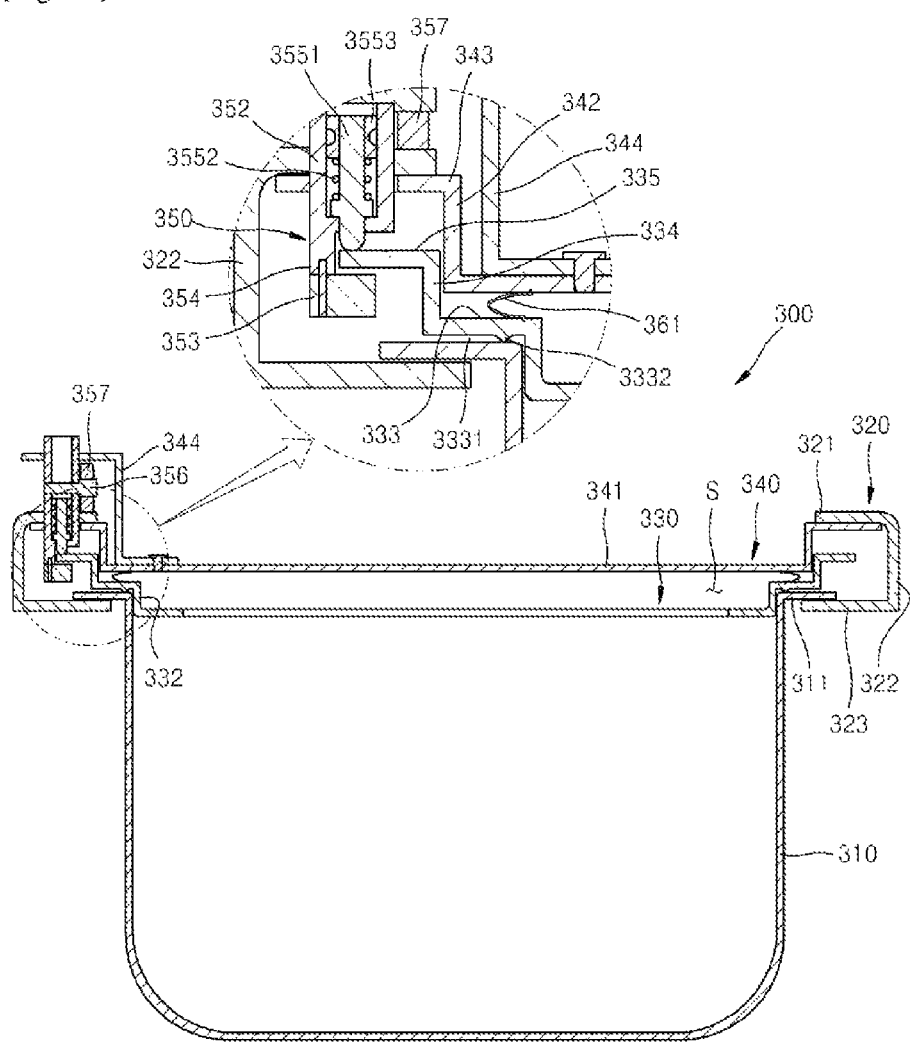
[Fig. 18]

[Fig. 19]
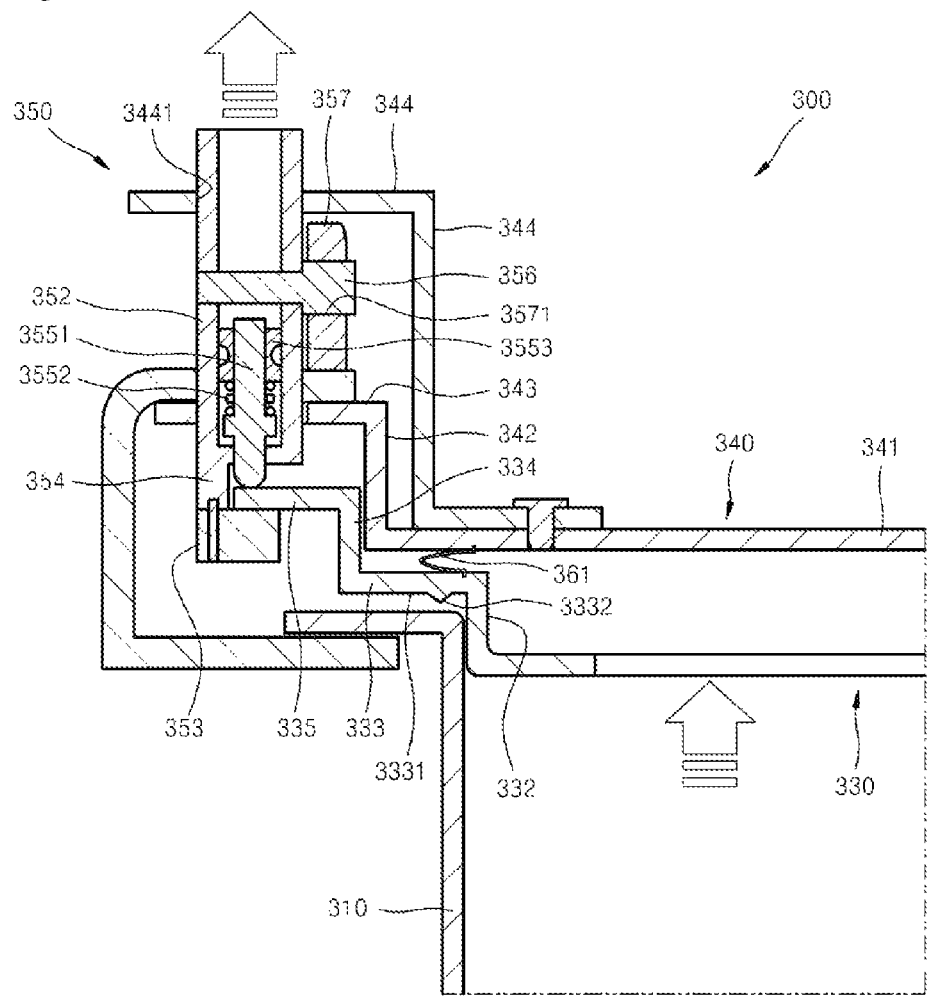
[Fig. 20]
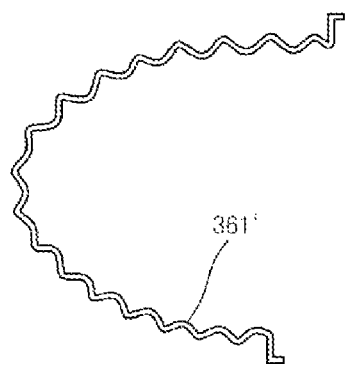

ELECTRIC RICE PRESSURE COOKER AND PRESSURE COOKER WITHOUT A RUBBER PACKING

TECHNICAL FIELD

The present invention relates to an electric rice pressure cooker and a pressure cooker without a rubber packing and more particularly, the present invention relates to an electric rice pressure cooker and a pressure cooker without a rubber packing having a structure in which discharge of steam of an inner pot to the outside is prevented and a rubber packing is not used.

BACKGROUND ART

The use of an electric pressure rice cooker has been generalized in which food such as rice is generally accommodated in an inner pot and the inner pot is stably placed inside a main body so that the bottom surface of the inner pot tightly contacts a heat plate provided inside the main body and the inside of the inner pot is heated to a high temperature and high pressure state by the heat plate, thus cooking the food.

These electric pressure rice cookers can be divided into direction heating ones and induced heating ones according to heating methods.

In the direct heating electric pressure rice cooker, a heater coil installed on the bottom portion and external side surface of the inner pot is heated by receiving power, thus directly heating the inner pot for cooking and keeping warmth.

In the induced heating electric pressure rice cooker, an induction coil which receives power and generates an induced current is provided as a heat source member and the inner pot is made of a material which can provide heat by the induced current for cooking and keeping warmth.

As described above, the direct heating electric pressure rice cookers and the induced heating electric pressure rice cookers are different from each other. However, in their structures, only some elements forming the inside of the main body case are different from each other and the rest elements including the covers are the same.

Each of the direct heating electric pressure rice cookers and the induced heating electric pressure rice cookers is generally formed with a main body case 1, an inner pot 70 which is stably placed inside the main body case 1, and a cover 3 which is hinge-coupled to the top portion of the main body case 1.

The main body case 1 includes a variety of electric devices for heating an inner pot 70 and a support plate 5 which supports the inner pot 70.

Here, the inner pot 70 has a cylindrical receiving space 71 for receiving grains, and a plurality of coupling flanges 72 formed along the outer periphery of the top end of receiving space 71.

The cover 3 is formed with an outer cover 10 for hinge-coupling to the main body case 1, a locking unit 20 which is operated by a handle 21 coupled to a handle coupling groove 13 of the outer cover 10, an inner cover 30 which is coupled to the bottom portion of the outer cover 10 and guides the operation of the locking unit 20, a locking ring 40 which is coupled to the bottom portion of the inner cover 30 and is controlled by the locking unit 20, a top portion heating plate 50 which is coupled to a handle axis 22 at the bottom portion of the locking ring 40 and supports the locking ring 40 in a rotatable state, and a packing 60 which is inserted into a packing groove 52 formed on the bottom surface of the top portion heating plate 50 to maintain a tight seal of the inner pot 70.

The outer cover 10 includes a hinge portion 11 which is formed on the end of the back surface so as to be coupled to the main body case 1, a steam discharge portion which is formed on the back side of the top surface so as to discharge high-pressure steam, a handle coupling groove which is formed on the front side of the top surface so as to couple the handle 21, and an opening button 14 which is elastically formed on the end of the front surface so as to open the cover 3 from the main body case 1.

The locking unit 20 is formed with a handle 21 which is coupled to the handle coupling groove 13 of the outer cover 10, the handle axis 22 which is formed as a bottom portion of the handle 21 in a predetermined length, a top portion washer 23 and a bottom portion washer 24 to be placed on the handle axis 22, and an arm member 25 which is coupled to the handle axis 22 by the top portion washer 23 and bottom portion washer 24.

Here, the arm member 25 is made by twice bending a plate each time at a right angle, and an axis groove 25A formed on one side end is coupled to the handle axis 22 and a coupling protrusion 41 of the locking ring 40 is coupled to a protrusion groove 25B formed on the other side end of the arm member 25.

Formed on the top end surface of the inner cover 30 are a protrusion groove portion 31 supporting the handle axis 22 to which the arm member 25 is coupled, a pipe penetration groove 32 into which a solenoid valve pipe (not shown) and pressure pendulum valve pipe (not shown) penetrate, and a guide groove 33 into which the protrusion unit 41 of the locking ring 40 is inserted and rotates in a predetermined angle.

The locking ring 40 is formed in a circular ring shape having a flange on each of the top side end surface and the bottom side end surface and an open inner side surface. The locking ring 40 has a plurality of coupling grooves 42 on the inner circumferential surface of the bottom end portion with the flange corresponding to the coupling flange 72 of the inner pot 70, and a protrusion portion 41 on one location of the top end portion having the flange on the top end surface.

On a plate having a recess with a predetermined depth, the top portion heating plate 50 has an axis fixing portion 51 formed to be coupled with the handle axis 22, and a packing groove 52 formed on the peripheral portion of the bottom surface to allow the packing 60 to be inserted into.

Here, the top portion heating plate 50 performs a role of a shutter to maintain a tight seal of the inner pot 70.

The assembly process of the electric rice pressure cooker formed as described above according to the prior art will now be explained.

First, the outer cover 10 is hinge-coupled to the main body case 1.

Then, the handle 21 is coupled to the handle coupling groove 13 formed on the outer cover 10. On the handle axis 22 penetrating the outer cover 10, the top portion washer 23, the arm member 25, and the bottom portion washer 24 are coupled in order.

Then, the inner cover 30 is coupled. The solenoid value pipe (not shown) and the pressure pendulum value pipe (not shown), and the handle axis 22 are coupled with and penetrate corresponding to the pipe penetration groove 32 and the protrusion groove portion 31, respectively.

Then, when the locking ring 40 is coupled, the protrusion portion 41 is made to penetrate the guide groove 33 of the inner cover 30 and to be inserted into the protrusion groove 25B of the arm member 25.

Then, the handle axis 22 is coupled to the axis fixing portion 51 formed on the top portion heating plate 50.

Here, the axis fixing portion 51 and the handle axis 22 are coupled in order for the handle axis 22 to rotate.

Finally, to the packing groove 52 formed on the bottom portion of the top portion heating plate 50 the packing 60 is coupled.

Here, the operation of the prior art having the assembly process as described above will now be explained.

If the cover 3 formed by the assembly process is closed, the coupling groove 42 of the locking ring 40 and the coupling flange 72 of the inner pot 70 do not interfere each other. This state is also a state in which the cover 3 can be freely opened or closed and a state for keeping warmth of already cooked rice.

Meanwhile, when cooking is performed, the locking unit 20 which can stand a high temperature pressure occurring in the cooking is required. In an operation of the locking unit 20 according to this, if the handle 21 coupled to the top portion of the outer cover 10 is rotated in a predetermined angle in the locking direction, the arm member 25 coupled to the handle axis 22 rotates, and if the protrusion portion 41 of the locking ring 40 inserted into the protrusion groove 25B formed on the other end of the arm member 25 is rotated along the guide groove 33, the locking ring 40 rotates as if it wraps the outer circumference of the inner pot 70. If the coupling flange 72 of the inner pot 70 except the coupling groove 42 of the locking ring 40 is completely getting in the locking unit 43, the rotation is finished and the locking unit 20 can fully stand the pressure in a high temperature and high pressure cooking.

After finishing the cooking, the locking state can be simply released in a reverse order of the method described above.

The rice pressure cooker according to the prior art has a packing made of a rubber material and provided on the bottom portion of the top portion heating plate in order to prevent steam occurring in the cooking process from being discharged to the outside. However, this packing is made of a rubber material, and thus can be easily worn out in the repetitive opening and closing of the cover. Due to this wearing, the maintenance cost caused by replacing the packing increases.

Also, steam occurring from the food being cooked contacts the packing and changes into water drops to fall on the food. A packing used long time and worn is itself a pollutant and steam contacting this can also be contaminated. In particular, a synthetic resin material such as a rubber used as a packing can generate environmental hormone and also in the aspect of health, it is not desirable.

DETAILED DESCRIPTION OF THE INVENTION

Technical Problem

The present invention provides an electric rice pressure cooker without a rubber packing in which steam occurring in the cooking process is made not to be discharged outside without a rubber packing, and thus, frequent replacement of a rubber packing is not required and the maintenance cost is saved, and there is no concern about steam-turned water drops after contacting a rubber packing flowing back into food, which provides a hygienic merit.

Technical Solution

According to an aspect of the present invention, there is provided an electric rice pressure cooker without a rubber packing, the pressure cooker including: a main body case which has an open top; an inner pot which is provided inside the main body case; and a cover which is hinge-coupled to the main body case and disposed to cover the open top of the main body case, wherein the inner pot includes: a plurality of flange portions provided on a top portion of the inner pot at predetermined intervals along a circumferential direction of the inner pot; and a tapered sloped surface formed on the top end of the inner pot, and the cover includes: a sealing member which has a circular hole in the center thereof and is seated on the inner pot, and has a bottom surface which is seated on and contacts the inner pot, and is formed to correspond to the top end of the inner pot; and an inner cover which has a receiving space therein in which the sealing member moves vertically and the inner surface of the receiving space is configured to maintain a tight seal with the peripheral end portion of the sealing member, and the sloped surface of the inner pot is tapered toward inside, and the sealing member has a bent portion so as to contact the sloped surface of the inner pot and the inner surface of the inner cover, and a part of the bent portion contacting the sloped surface is formed as a sealing surface which corresponds in shape to the sloped surface so that steam generated during cooking passes through the circular hole and presses the sealing member downwards to maintain a tight seal with the inner pot.

Advantageous Effects

According to the electric rice pressure cooker, a sealing member which is provided to a cover without a separate rubber packing and is capable of being coupled to the top end of an inner pot with a tight sealing can prevent steam occurring in a cooking process from being discharged to the outside. Accordingly, frequent replacement of a rubber packing is not required and the maintenance cost is saved.

Also, as the sealing member made of a metal material is used to prevent steam occurring in a cooking process from being discharged to the outside without a rubber packing, it has a hygienic advantage.

DESCRIPTION OF THE DRAWINGS

FIG. 1 is a sectional view of an electric rice pressure cooker according to a prior art;

FIG. 2 is an exploded perspective view of major parts shown in FIG. 1;

FIG. 3 is a sectional view of an electric rice pressure cooker according to exemplary embodiment of the present invention;

FIG. 4 is a diagram showing an operation of the electric rice pressure cooker shown in FIG. 3;

FIG. 5 is a sectional view of an electric rice pressure cooker according to another exemplary embodiment of the present invention;

FIG. 6 is a sectional view of an electric rice pressure cooker according to another exemplary embodiment of the present invention;

FIG. 7 is a diagram showing an operation of the electric rice pressure cooker shown in FIG. 6;

FIGS. 8 and 9 are sectional views of electric rice pressure cookers according to another exemplary embodiment of the present invention;

FIG. 10 is an exploded perspective view of a pressure cooker without a rubber packing according to another exemplary embodiment of the present invention;

FIG. 11 is a perspective view showing an assembled state of the pressure cooker shown in FIG. 10;

FIG. 12 is an exploded perspective view of major parts of the pressure cooker shown in FIG. 10;

FIG. 13 is a perspective view showing an assembled state of the major parts shown in FIG. 12;

FIG. 14 is a XIV-XIV sectional view of the major parts shown in FIG. 13;

FIG. 15 is a XV-XV sectional view of the pressure cooker shown in FIG. 11;

FIG. 16 is a diagram showing a cooking process of the pressure cooker without a rubber packing shown in FIG. 15;

FIG. 17 is a diagram showing an operation process of the pressure cooker without a rubber packing shown in FIG. 16;

FIG. 18 is a diagram of a pressure cooker without a rubber packing according to another exemplary embodiment of the present invention;

FIG. 19 is a diagram showing an operation of the pressure cooker shown in FIG. 18; and FIG. 20 is a diagram of a pressure cooker without a rubber packing according to another exemplary embodiment of the present invention.

BEST MODE

An electric rice pressure cooker according to an exemplary embodiment of the present invention will now be explained with reference to attached drawings.

The electric rice pressure cooker according to the embodiment has a main body case which has an open top, an inner pot 100 which is provided inside the main body case, and a cover 10 which is hinge-coupled to the main body case and disposed to cover the open top of the main body case. The main body case and the outer cover of the cover 110 are similar to those of prior art, and therefore detailed explanation will be omitted. Also, detailed explanation of a heating unit and related parts for heating the inner pot 100 will be omitted.

The inner pot 100 is to be placed in the main body case, and is a container which accommodates rice and water for cooking, and has a shape having an open top. On the top portion of the inner pot 100, a plurality of flange portions 101 disposed along the circumferential direction at predetermined intervals are provided. These flange portions 101 have a shape protruding outward and a structure to be locked to a locking rotation body 160.

The top end of the inner pot 100 has a tapered sloped surface 102. The tapered sloped surface 102 is formed toward the inside. In detail, the sloped surface 102 is continuously formed on the top end of the inner pot 100 along the circumferential direction, and has a shape sloping from the top end to the bottom end toward the inside.

The cover 110 includes a sealing member 120, an inner cover 130, an elastic bias member 140, a separation prevention member 150 and a locking rotation body 160.

The sealing member 120 has a circular hole at the center of the sealing member 120, and is stably placed on the inner pot 100. The bottom surface of the sealing member 120 which is placed on and contacts the inner pot 100 is formed to have a shape corresponding to the top end of the inner pot 100. In detail, the sealing member 120 has a ring shape as a whole, and along the peripheral has a bent portion 122 which is bent twice at right angles. The bent portion 122 contacts the sloped surface 102 of the inner pot 100 and the inner side surface 132 of the inner cover 130. The place where the bent portion 122 faces the sloped surface 102, a sealing surface 123 having a shape corresponding to the sloped surface 102 is formed.

In detail, the sealing surface 123 has a shape sloping from the top side to the bottom side toward the inside. Meanwhile, on the top surface of the peripheral of the sealing member, a first groove 124 which is made concave is formed. On the first groove 124, one end of the elastic bias member 140 may be stably placed.

Also, in the sealing member 120, a first hole 125 penetrating vertically between the top surface and the bottom surface may be provided. Through this first hole 125, the separation prevention member 150 may be put.

Meanwhile, the sealing member 120 may be any metal material capable of corrosion prevention, and may be stainless steel. However, it is not limited to this, and a variety of metal materials, and ceramic materials may be used.

The inner cover 130 has a disk shape as a whole, and the peripheral of the inner cover 130 is bent downward.

In this inner cover 130, a structure for measuring the pressure of steam generating in a cooking process, or for discharging steam to the outside after cooking is finished may be provided, but detailed explanation will be omitted.

A receiving space 131 in which the sealing member 120 is inserted into the inner cover 130 and can move vertically is provided. The inner side surface of the receiving space 131 and the end portion of the peripheral of the sealing member 120 are formed to maintain a tight seal.

In detail, the inner diameter of the receiving space 131 of the sealing member 120 is made to be equal to the outer diameter of the sealing member 120 so that leaking of steam to the outside through the gap between the sealing member 120 and the inner cover 130 is minimized.

In the inner cover 130, a second groove 133 is proved on a location corresponding to the first groove 124 of the sealing member 120, and thus, the other end of the elastic bias member 140 is inserted into the second groove 133 and stably placed.

Also, on a location corresponding to the first hole 125 of the sealing member 120, a groove 134 is provided and thus the separation prevention member 150 penetrating the first hole 125 is coupled to the groove 134. At this time, a thread is formed on the inner circumferential surface of the groove 134 so that the separation prevention member 150 is screwed to be coupled to the groove 134.

The elastic bias member 140 elastically biases the sealing member 120 in the direction opposite to the inner cover 130, and is disposed between the sealing member 120 and the inner cover 130. In detail, as the elastic bias member 140 a compression coil spring may be provided but the embodiment is not limited to this and a variety of structures capable of elastic restoration may be used. One end of this elastic bias member 140 may be placed in the first groove 124 of the sealing member 120 and the other end may be placed in the second groove 133 of the inner cover 130.

The separation prevention member 150 is to prevent the sealing member 120 and the inner cover 130 from being separated farther than a predetermined distance, and in detail, prevents the sealing member 120 from being completely separated from the inner cover 130. The separation prevention member 150 may have a thread on the lower portion and may have a shape of a pin having a head with a diameter bigger than that of the body. With the head of the separation prevention member 150 placed lower side, the separation prevention member 150 penetrates the first hole 125 and the end portion of the separation member 150 is coupled to the second groove 134. The sealing member 120 may be supported by the head of the separation prevention member 150.

With rotating relative to the inner pot 100, the locking rotation body 160 may be selectively locked to the flange portions 101. The locking rotation body 160 may rotate relative to the inner pot 100 by a known rotation unit, and according to the rotation direction, the locking rotation body 160 may be locked to or unlocked from the flange portions 101.

An operation of the electric rice pressure cooker according to the exemplary embodiment of the present invention will now be explained.

Firstly, food such as rice and water is placed into the inner pot 100 and the cover 110 is closed. In detail, after covering with the outer cover, the locking rotation body 160 is rotated such that the locking rotation body 160 is locked to the flange portions 101 of the inner pot 100. At this time, the peripheral of the inner pot 130 is positioned on the top surface of the flange portions 101 and the sealing member 120 is in contact with the sloped surface 102 of the inner pot 100 and the inner side surface 132 of the inner cover 130.

At this time, as the sealing member 120 is elastically biased by a spring, a tight seal with the inner pot 100 may be maintained. Meanwhile, the sealing surface 123 of the sealing member 120 is in tight contact with the sloped surface of the inner pot 100 so as to maintain a tight seal.

As cooking is progressing, as shown in FIG. 4, steam is generated. The generated steam starts to press the sealing member 120. In detail, the sealing member 120 is pressed downward such that the sealing member 120 fully maintains a tight seal with the inner pot 100. Also, the end portion of the sealing member 120 contacts the inner side surface 132 of the inner cover 130 to maintain a tight seal, and thus discharge of the steam may be minimized.

Like this, the electric rice pressure cooker according to the embodiment of the present invention maintains a tight seal by using the sealing member 120 without a separate rubber packing. Accordingly, there is little concern about replacement due to long time use, and thus the maintenance cost is saved.

Also, concerns about possible environmental hormone generated by a rubber packing or hygienic dirtiness caused by water drops generated from steam contacting a corroded rubber packing can be avoided.

The electric rice pressure cooker without a rubber packing according to the present invention may be modified as the following.

As shown in FIGS. 6 and 7, an electric rice pressure cooker according to another exemplary embodiment of the present invention has a main body case which has an open top, an inner pot 200 which is provided inside the main body case, and a cover 210 which is hinge-coupled to the main body case and disposed to cover the open top of the main body case. The main body case and the outer cover of the cover 210 are similar to those of prior art, and therefore detailed explanation will be omitted. Also, detailed explanation of a heating unit and related parts for heating the inner pot 200 will be omitted.

The inner pot 200 is to be placed in the main body case, and is a container which accommodates rice and water for cooking, and has a shape having an open top. On the top portion of the inner pot 200, a plurality of flange portions 201 disposed along the circumferential direction at predetermined intervals are provided. These flange portions 201 have a shape protruding outward and a structure to be locked to a locking rotation body 260.

The inner circumferential surface 202 of the top end of the inner pot 200 is formed to be sloped downward toward the center of the inner pot 200 such that the sealing member 220 disposed in the inner pot 200 can be easily inserted into the inner pot 200. This inner circumferential surface 202 of the top end is rounding-processed such that the sealing member 220 can be glidingly inserted into the inner pot 200. In detail, the inner circumferential surface 202 of the top end is formed such that a first part 221 of the sealing member 220 can be easily inserted.

The cover 210 includes the sealing member 220, the inner cover 230, an elastic bias member 240, a detachable coupling unit 250, and a locking rotation body 160.

The sealing member 220 has a on the peripheral portion of the sealing member 220 a sealing protrusion 222E protruding downward so as to contact the top surface of the inner pot 200, and has at the center a hole 220B penetrating the sealing member 220 between the top surface and the bottom surface of the sealing member 220. The sealing member 220 includes the first part 221 which is inserted into the inside of the inner pot 200, and a second part 222 which is coupled with the first part 221 to form one body, and is exposed to the outside of the inner pot 200 and has the sealing protrusion 222E on the bottom surface of the peripheral of the second part 222.

The sealing member 220 has a disk shape as a whole, and has at the center a coupling hole 220A into which a screw which is the detachable coupling unit 250 is inserted, and a hole 220B which is disposed around the coupling hole 220A and allows steam to flow in a sealing space S.

The second part 222 includes a disk portion 222A having a disk shape, a first extension portion 222B which is extended outwardly from the disk portion 222A and of which bottom surface is facing the top surface of the inner pot 200, a bent portion 222C which is bent upwards from the first extension portion 222B, and a second extension portion 222D which is extended outwardly from the bent portion 222C.

By the bent portion 222C and the top surface of the disk portion 222A, the sealing space S is formed. In detail, the sealing space S is a space formed by the bent portion 222C, the top surface of the disk portion 222A and the inner cover 230, and steam flowing in through the hole 220B is sealed in the sealing space S and shut off from the outside.

At this time, the sectional area of the top surface of the sealing member 220 which the steam flowing into the sealing space S through the hole 220B contacts is greater than the sectional area of the bottom surface of the sealing member 220 which the steam contacts, thus allowing the steam generated in the cooking process to press the sealing protrusion 222E of the sealing member 220 onto the top surface of the inner pot 200. At this time, the horizontal area of the sealing space S may be greater than the horizontal area of the inner pot 200.

According to this, the downward pressure to the sealing member 220 is greater than the steam pressure which lifts the sealing member 220 up, and thus the sealing member 220 can contact the inner pot 200 in a tight seal. According to this, leaking of steam between the inner pot 200 and the sealing member 220 can be prevented.

On the bottom surface of the first extension portion 222B, the sealing protrusion 222E protruding downward and a concave groove 222F are provided.

The sealing protrusion 222E has a cross section of a near-trapezoid shape, and the surface of the sealing protrusion 222E which contacts the top surface of the inner pot 200 has a roughly flat shape. This sealing protrusion 222E is to prevent steam inside the inner pot 200 from leaking to the outside, and may be made of the same material as that for the sealing member 220. The concave groove 222F is provided between the sealing protrusion 222E and the first part 221, and is a groove concave downward.

The sealing member 220 may be made of any metal material that is capable of corrosion prevention, and may be made of any one material of aluminum, pig iron, copper, brass, and stainless steel. However, the embodiment is not limited to this, and a variety of metal materials and ceramic materials may be used.

The inner cover 230 is to guide the sealing member 220 so that the sealing member 220 can move vertically. The inner cover 230 is position-fixed on the flange portions 201 by the locking rotation body 260. This inner cover 230 has a disk shape as a whole, and a part of the inner cover 220 corresponding to the sealing space S is protruding downward.

In detail, the side surface of the protruding part of the inner cover 230 is formed to contact the inner side surface of the bent portion 222C of the sealing member 220. Between the protruding part of the inner cover 230 and the bent portion 222C, an O-ring for maintaining a tight seal of the sealing space S is provided such that when the sealing member 220 moves vertically, leaking of steam to the outside between the sealing member 220 and the inner cover 230 can be prevented.

At the center of this inner cover 230, provided is a hole 231. The inner circumferential surface of the hole 231 has a thread so that the detachable coupling unit 250 can be coupled to. On a location corresponding to the second extension portion 222D of the sealing member 220, an insertion hole 232 into which the elastic bias member 240 can be inserted is provided. A plurality of the insertion holes 231 are disposed along the circumferential direction of the inner cover 230.

The elastic bias member 240 is to elastically bias the sealing member 220 in the inner pot 200 direction. The elastic bias member 240 is formed with a pin member 241, a spring 242, and a blocking member 243. The elastic bias member 240 is provided inside the insertion hole 232 of the sealing member 220.

The pin member 241 is provided in a pin shape, and a hanger portion 241A with a disk shape is provided about the center of the pin member 241. The top end of the pin member 241 may be inserted through the blocking member 243 and placed above the blocking member 243, and the lower portion of the pin member 241 may be protruding to the outside beyond the insertion hole 232, and may contact the second extension portion 222D of the sealing member 220.

The spring 242 is provided between the blocking member 243 and the disk-shaped hanger 241A and elastically presses the disk-shaped hanger 241A in the direction opposite to the blocking member 243.

The blocking member 242 has a hole at the center through which the pin member 241 can be inserted, and is elastically supported by the spring 242. This blocking member 243 is position-fixed inside the insertion hole 232.

The detachable coupling unit 250 detachably couples the inner cover 230 and the sealing member 220, and is screw-fixed to inner cover 230 through the sealing member 220.

This detachable coupling unit 250 is formed with a screw member 252 which has a cylinder shape having a thread on each of the top part and bottom part and a smooth surface at the center, and a nut member 251 which is screw-coupled to the thread formed on the bottom part of the screw member 252. With the thread on the top part of the screw member 252 being screw-coupled to the inner cover 230, the sealing member 220 contacts the smooth center part of the screw member 252.

The nut member 251 is formed such that when the sealing member 220 is stably placed in the inner pot 200, the nut member 251 is disposed at a little distance from the sealing member 220 and when the sealing member 220 moves away from the inner pot 200, the nut member 251 prevents the sealing member 220 from leaving the inner cover 230.

However, when the nut member 251 is removed from the screw member 252, the sealing member 220 can easily leave the inner cover 230.

With rotating relative to the inner pot 200, the locking rotation body 260 may selectively be locked to the flange portions 201. The locking rotation body 260 may rotate relative to the inner pot 200 by a known rotation unit, and according to the rotation direction, the locking rotation body 260 may be locked to or unlocked from the flange portions 201.

An operation of the electric rice pressure cooker according to the exemplary embodiment of the present invention will now be explained.

Firstly, food such as rice and water is placed into the inner pot 200 and the cover 210 is closed. In detail, after covering with the outer cover, the locking rotation body 260 is rotated such that the locking rotation body 260 is locked to the flange portions 201 of the inner pot 200. At this time, the locking rotation body 260 position-fixes the inner cover 230 relative to the flange portions 201 such that position movement of the inner cover 230 moving upwards, downwards, to the left or to the right can be prevented. Meanwhile, as the elastic bias member 240 presses downwards the sealing member 220, the sealing member 220 contacts the inner pot 200 with being pressed with a predetermined force.

As cooking is progressing, as shown in FIG. 7, steam is generated. The generated steam starts to press the sealing member 220. In detail, the sealing member 220 is pressed downwards such that the sealing member 120 fully maintains a tight seal with the inner pot 200. In detail, in the sealing space S the steam pressure pressing downwards the sealing member 220 is greater than the steam pressure lifting the sealing member upwards, and therefore the sealing member 220 can contact the inner pot 200 fully maintaining a tight seal.

Also, in the sealing member 220, the sealing protrusion contacting the inner pot 200 has a flat and narrow surface which contacts the inner pot 200. Accordingly, the pressure by the steam pressure can be focused on locally, and thus a tight seal between the sealing member 220 and the inner pot 200 can be fully maintained. Also, even when the sealing member 220 is inserted into the inner pot 200 with a slightly inclined state with respect to the inner pot 200, a tight seal can be easily maintained.

Like this, the electric rice pressure cooker according to the embodiment of the present invention can be used a long time without compromising durability because a tight seal between the inner pot 200 and the sealing member 220 can be maintained by the steam pressure.

Also, the sealing protrusion of the sealing member 220 maintains a tight seal with the inner pot 200 without a separate rubber packing. Accordingly, there is little concern about replacement due to long time use, and thus the maintenance cost is saved.

Also, concerns about possible environmental hormone generated by a rubber packing or hygienic dirtiness caused by water drops generated from steam contacting a corroded rubber packing can be avoided.

A pressure cooker without a rubber packing according to another exemplary embodiment of the present invention is to heat a variety of grains such as rice and barley or other material requiring cooking put in a pressure pot, and may be an electric rice pressure cooker, but is not limited to this. The pressure cooker may be a pressure pot for cooking with heat provided from gas, and may include a variety of utensils.

For example, in the embodiment shown in FIGS. 6 and 7, it is exemplified that the inner side surface of the inner pot is sloped. However, the embodiment is not limited to this, and as shown in FIG. 8, the inner side surface 202' of the top end may have square corners. Also, though it is exemplified that the sealing protrusion 222E is made of the same material as that for the sealing member 220 in the embodiment of FIGS. 6 and 7 described above, a sealing protrusion 222E' may be made of a different material or the same material with a predetermined heat treatment on the surface as shown in FIG. 8. When the strength of the sealing protrusion is greater than that of the sealing member, tight sealing is less degraded in a long term use.

Also, though in the embodiment shown in FIGS. 6 and 7, a single sealing protrusion 222E is disposed, the embodiment is not limited to this and as shown in FIG. 9, two or more sealing protrusions 222E" may be provided.

Another exemplary embodiment of the present invention will now be explained with reference to FIGS. 10 through 17.

The pressure cooker 300 without a rubber packing according to the exemplary embodiment of the present invention is to heat a variety of grains such as rice and barley or other material requiring cooking put in a pressure pot 310, and may be an electric rice pressure cooker, but is not limited to this. The pressure cooker may be a pressure pot 310 for cooking with heat provided from gas, and may include a variety of utensils. For convenience of explanation, the embodiment will be explained based on an electric rice pressure cooker.

The pressure cooker 300 without a rubber packing may be formed with a pressure pot 310, a locking rotation body 320, a sealing member 330, an inner cover 340 and a position movement unit 350.

The pressure pot 310 is a container in which rice, water and other required to be cooked are placed, and has a container shape having an open top. On top end of the pressure pot 310, a plurality of flanges are provided along the circumferential direction at predetermined intervals. These flanges have a shape protruding outside and to be locked to the locking rotation body 320.

The locking rotation body 320 may be selectively locked to the flanges with rotating relative to the pressure pot 310. The locking rotation body 320 may rotate relative to the pressure pot 310 by a known rotation unit, and according to the rotation direction, the locking rotation body 320 may be locked to or unlocked from the flanges 320.

The locking rotation body 320 is formed with a top part ring portion 321 with a ring shape, a bent portion 322 bent downwards from the peripheral of the top part ring portion 321, and a plurality of locking portions 323 extending from the bottom end of the bent portion 322 to the inside. The top part ring portion 321 includes a plurality of guide grooves 3211 extend along the circumferential direction. Into the guide grooves 3211, a sliding member 351 may be inserted and move along the circumferential direction.

The sealing member 330 has on the peripheral a sealing surface 3331 capable of contacting the top end of the pressure pot 310, and has a hole 3311 penetrating the sealing member 330 between the top surface and bottom surface so as to allow steam generated from the pressure pot 310 to be discharged to the above the sealing member 330. The sealing member 330 may move vertically with being guided by the inner cover 340. The sealing member 330 is formed with a disk portion 331 with a near disk shape, a first bent portion 332 bent upwards from the peripheral of the disk portion 331, a sealing portion 333 bent to the outside from the first bent portion 332, a second bent portion 334 bent upwards from the peripheral of the sealing portion 333, and a pressure portion bent upwards from the peripheral of the sealing portion 33 and contacting an elastic pressure member 355. Roughly at the center of the disk portion 331, a plurality of holes 3311 penetrating between the top surface and bottom surface are formed. The holes 3311 allow steam generated from the pressure pot 310 to be discharged into a sealing space S above, and roughly 4 holes may be provided. However, the embodiment is not limited to this and the positions and number of holes may vary. On the bottom surface of the sealing portion 333, a sealing surface 3331 capable of contacting the top end of the pressure pot 310 is provided, and in detail, a sealing protrusion 3332 protruding downwards is provided on the sealing surface 3331. The sealing protrusion 3332 may have a near-trapezoid shape with the shorter parallel side being the protruding end, but is not limited to this and may vary in many ways. The inner surface of the second bent portion contacts the inner cover 340 with a tight seal, and between the second bent portion 334 and the inner cover 340, a sealing maintenance member such as an O-ring 360 may be provided. The pressure portion contacts a pressure pin 3551 of the elastic pressure member 355, and when pressed by the pressure pin 3551, allows the sealing portion 333 to contact the top end of the pressure pot 310. The sealing member 330 may be made of any one material of aluminum, pig iron, copper, brass, and stainless steel. However, the embodiment is not limited to this, and may vary in a variety ways.

The inner cover 340 guides the sealing member 330 such that the sealing member 330 moves vertically. The sealing space S in which steam generated from the pressure pot 310 is filled is provided between the inner cover 340 and the sealing member 330. This inner cover 340 is disposed inside the locking rotation body 320 and may be position-fixed by a top cover (not shown) of the electric rice pressure cooker.

The inner cover 340 is formed with a disk-shaped cover body 341 having a diameter corresponding to the sealing portion of the sealing member 330, and a sealing side wall 342 which is bent upwards from the peripheral of the cover body 341. An extension portion 343 which is bent to the outside is provided on a part of the sealing side wall 342. Three extension portions 343 are disposed at predetermined intervals, and on each of the extension portions 343, a first penetration hole 3431 having a section shape corresponding to the sliding member 351 is formed. Into the first penetration hole 3431, the sliding member 351 may be inserted. To the cover body 341 of the inner cover 340, a support member 344 which is disposed immediately above the first penetration hole 3431 and has a second penetration hole 3441 disposed at a predetermined distance from the first penetration hole 3431 is coupled. At this time, the sliding member 351 may be inserted into the second penetration hole 3441.

The sliding member 351 may be inserted into the first and second penetration holes 3431 and 3441 in order to guide a vertical movement.

According to a rotation of the locking rotation body 320, the position movement unit 350 allows the sealing surface 3331 of the sealing member 330 to position-move between a first position (the position shown in FIG. 15) where the sealing surface 3331 of the sealing member 330 contacts the top end of the pressure pot 310, and a second position (the position shown in FIG. 10) where the sealing surface 3331 of the sealing member 330 is separated from the top end of the pressure pot 310. This position movement unit 350 includes the sliding member 351 and a guide member 357. The sliding member 351 is capable of moving vertically with the sealing member 330 with being coupled to the sealing member 330. The sliding member 351 includes a top portion 352 with a near rectangular cuboid; a bottom portion 353 which is disposed separated from the top portion 351 such that the peripheral of the sealing member 330 is inserted between the top portion 352 and the bottom portion 353; and a connection portion 354 connecting the top portion 352 and the bottom portion 353. With rotating relative to the connection portion 354, the bottom portion 353 enables the sealing member 330 to be released to the below or to be hung on the bottom portion 353 and position-fixed. Meanwhile, the present embodiment shows a total of 3 sliding members 351 and among the three sliding members 351, only one sliding member 351 needs to have a rotating bottom portion 353, and each of the other sliding members 351 may have a fixed bottom portion 353. In the top portion 352 of the sliding member 351, a vertical hole 3521 penetrating vertically and a horizontal hole 3522 passing through the vertical hole 3521 and penetrating horizontally are provided.

The elastic pressure member 355 which presses downwards the sealing member 330 is provided in the vertical hole 3521. The elastic pressure member 355 includes the pressure pin 3551, a spring 3552, and a stopper 3553. A part of the pressure pin 3551 is disposed in the sliding member 351 and the rest part of the pressure pin 3551 is protruding from the sliding member 351 so as to contact the sealing member 330. The spring 3552 is put on the pressure pin 3551 and the top end of the spring 3552 is supported by the stopper 3553 so as to elastically press the pressure pin 3551 in the sealing member 330 direction. The spring 3552 together with the pressure pin 3551 is provided inside the sliding member 351. The stopper 3553 is provided inside the sliding member 351 to support the top end of the spring 3552, and may be position-fixed by a predetermined pin. The horizontal hole 3552 accommodates the guide pin 356 protruding from the side surface of the horizontal hole 3552. The part of the guide pin 356 protruding from the sliding member 351 is put into a slot 3571 of the guide member 357 and the rest of the guide pin 356 is disposed inside the horizontal hole 3522.

The guide member 357 is disposed in an upright position along the guide groove 3211, and changes the height of the guide pin 356 of the sliding member 351. A slot 3571 is formed on the guide member 3357 and the guide pin 356 is inserted into the slot 3571 having a height varying along the circumferential direction. The slot 3571 is formed such that the height of one side is low and that of the other side is relatively higher than the one side, and between the two sides, the height gradually increases. The guide pin 356 slidingly contacts the slot 3571. A number of the guide members 357 corresponding to the number of the sliding members 351 are provided.

Meanwhile, in the present embodiment, when steam is generated inside the pressure pot 310, the sectional area of the top surface of the sealing member 330 which the steam flowing into the sealing space S through the hole 3311 contacts is greater than the sectional area of the bottom surface of the sealing member 330 which the steam contacts, thus allowing the steam to press the sealing member 330 onto the top surface of the inner pot.

An operation of the electric rice pressure cooker according to the exemplary embodiment of the present invention will now be explained.

First, with food such as rice and water being put inside the pressure pot 310, the sealing member 330, the inner cover 340, and the locking rotation body 320 are placed on top of the pressure pot 310, and then, the locking rotation body 320 is rotated such that the locking rotation body 320 is locked into the flanges of the pressure pot 310. At this time, the elastic pressure member 355 presses downwards the sealing member 330 such that the sealing member 330 firstly contacts the top end of the pressure pot 310. Then, as cooking progresses, as shown in FIG. 16, steam is generated and the generated steam starts to press the sealing member 330. In detail, the steam presses downwards the sealing member 330 such that the sealing member 120 fully maintains a tight seal with the pressure pot 310. In detail, the steam pressure pressing from the sealing space S downwards the sealing member 330 is greater than the steam pressure lifting up from the below the sealing member 330, and therefore the sealing member 330 can contact the inner pot fully maintaining a tight seal.

Also, in the sealing member 330, the sealing protrusion 3332 contacting the inner pot has a flat and narrow surface contacting the inner pot. Accordingly the pressure by the steam pressure can be focused on locally, and thus a tight seal between the sealing member 330 and the inner pot can be fully maintained. Also, even when the sealing member 330 is inserted into the inner pot with a slightly inclined state with respect to the inner pot, a tight seal can be easily maintained.

After cooking is completed, if steam is made to be discharged to the outside in a predetermined degree (discharged through a steam hole, not shown, disposed on the inner cover 340) and the locking rotation body 320 is rotated, the slot 3571 of the guide member 357 is rotated according to the rotation of the locking rotation body 320, and thus, the guide pin 356 of the sliding member 351 is lifted up along the slot 3571 as shown in FIG. 17. As the guide pin 356 is lifted up, the sliding member 351 is lifted up at the same time and the sealing member 330 engaged into the sliding member 351 is also lifted up, and separated from the pressure pot 310. After the sealing member 330 is separated from the pressure pot 310, it is easy to completely remove the sealing member 330 from the pressure pot 310.

Like this, the pressure cooker without a rubber packing according to the present embodiment is formed such that even when the sealing member made of a metal material and the pressure pot are interlocked tightly during the cooking process, the sealing member can be gradually separated from the pressure pot according to a rotation of the locking rotation body. Accordingly, the sealing member can be removed easily from the pressure pot.

Also, in the process for coupling the sealing member to the pressure pot, the sealing member is made to approach the pressure pot gradually such that a shock occurring in a process for the pressure pot and the sealing member contacting can be minimized.

The pressure cooker shown in FIGS. 10 through 17 may be modified as shown in FIGS. 18 and 19. In the embodiment described above, the O-ring is provided between the sealing side wall 342 and the second bent portion 334 in order to maintain a tight seal between the inner cover 340 and the sealing member 330. However, the embodiment is not limited to this, and as shown in FIGS. 18 and 19, a bellows spring may be provided.

At this time, the bellows spring 361 is provided between the inner cover 340 and the sealing member 330 to maintain the sealing of the sealing space S. The bellows spring 361 has a cross section of a "C" shape, and according to the varying distance between the inner cover 340 and the sealing member 330, may elastically retract or restore. One end of the bellows spring 361 may be fixedly coupled with the peripheral of the cover body of the inner cover, and the other end of the bellows spring 361 may be fixedly coupled with the sealing portion. The bellows spring 361 can provide a seal between the inner cover 340 and the sealing member 330 without a surface contact unlike the O-ring, and thus enables a long time use.

Meanwhile, as shown in FIG. 20, a bellows spring 361' with a plurality of wrinkles may be used and a variety of modified shapes may be used.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. An electric rice pressure cooker, the pressure cooker comprising:
   a main body case having a base, a top, and at least one side extending from the base to the top, wherein the top is open;
   an inner pot which is provided inside the main body case; and
   a cover which is hinge-coupled to the main body case and disposed to cover the open top of the main body case, wherein:
      the inner pot comprises:
         a plurality of flange portions provided on a top portion of the inner pot at intervals along a circumferential direction of the inner pot; and
         a tapered sloped surface formed on a top end of the inner pot, and the cover comprises:
         a sealing member that is generally disk-shaped and which has a circular hole in the center thereof and is seated on the inner pot, and has a bottom surface which is seated on and contacts the inner pot, and is formed to correspond to a shape of the top end of the inner pot, wherein the sealing member comprises one or more of a metallic material or a ceramic material; and
         an inner cover which has a receiving space therein in which the sealing member is moveable in a vertical direction and an inner surface of the receiving space is configured to maintain a seal with a peripheral end portion of the sealing member, wherein a lower surface of the receiving space and a top end of the tapered sloped surface are spaced apart at a distance that is greater than a thickness of the sealing member, thereby creating a gap between the sealing member and the lower surface of the receiving space;
      wherein the inner cover has a disk shape, a periphery of the inner cover is bent downward, and the peripheral end portion of the sealing member is moveable in the vertical direction, the sealing member maintaining a seal with an inner side surface of the periphery of the inner cover; and
      an elastic bias member disposed between the sealing member and the inner cover, the elastic bias member being configured to elastically bias the sealing member in a direction opposite to the inner cover such that the sealing member is pressed against the top end of the inner pot;
   the sloped surface of the inner pot is tapered toward an interior of the inner pot;
   the sealing member has a bent portion that is configured to contact both the sloped surface of the inner pot and an inner surface of the inner cover;
   a part of the bent portion contacting the sloped surface is formed as a sealing surface which corresponds in shape to the sloped surface; and
   the bent portion is configured to be pressed downward toward the base by steam generated during cooking that passes through the circular hole to maintain a seal with the inner pot.

2. An electric rice pressure cooker, the pressure cooker comprising:
   a main body case having a base, a top, and at least one side extending from the base to the top, wherein the top is open;
   an inner pot which is provided inside the main body case; and
   a cover which is hinge-coupled to the main body case and disposed to cover the open top of the main body case, wherein:
      the inner pot comprises:
         a plurality of flange portions provided on a top portion of the inner pot at intervals along a circumferential direction of the inner pot; and
         a tapered sloped surface formed on a top end of the inner pot, and the cover comprises:
         a sealing member that is generally disk-shaped and which has a circular hole in the center thereof and is seated on the inner pot, and has a bottom surface which is seated on and contacts the inner pot, and is formed to correspond to a shape of the top end of the inner pot, wherein the sealing member comprises one or more of a metallic material or a ceramic material; and
         an inner cover which has a receiving space therein in which the sealing member is moveable in a vertical direction and an inner surface of the receiving space is configured to maintain a seal with a peripheral end portion of the sealing member, wherein a lower surface of the receiving space and a top end of the tapered sloped surface are spaced apart at a distance that is greater than a thickness of the sealing member, thereby creating a gap between the sealing member and the lower surface of the receiving space;
      wherein the inner cover has a disk shape, a periphery of the inner cover is bent downward, and the peripheral end portion of the sealing member is moveable in the vertical direction, and the sealing member maintaining a seal with an inner side surface of the periphery of the inner cover; and an elastic bias member disposed between the sealing member and the inner cover, the elastic bias member being configured to elastically bias the sealing member in a direction opposite to the inner cover such that the sealing member is pressed against the top end of the inner pot; and the sloped surface of the inner pot is tapered toward an exterior of the inner pot;

the sealing member has a bent portion that is configured to contact the sloped surface of the inner pot and an inner surface of the inner cover;

a part of the bent portion contacting the sloped surface is formed as a sealing surface which corresponds in shape to the sloped surface; and the bent portion is configured to be pressed downward toward the base by steam generated during cooking that passes through the circular hole to maintain a seal with the inner pot.

3. The pressure cooker of any one of claims 1 and 2, further comprising a separation prevention member which prevents the sealing member and the inner cover from being separated farther than a threshold distance.

4. The pressure cooker of claim 3, wherein the separation prevention member is a pin having a pin body with a threaded portion on which a thread is formed, the pin having a head positioned opposite the threaded portion, the head having a diameter larger than a diameter of the pin body.

5. The pressure cooker of any one of claims 1 and 2, wherein the sealing member is made of stainless steel.

6. The pressure cooker of any one of claims 1 and 2, further comprising a locking rotation body which is selectively locked with the flange portions.

* * * * *